United States Patent [19]

Takizawa et al.

[11] Patent Number: 5,406,789
[45] Date of Patent: Apr. 18, 1995

[54] AIR-FUEL RATIO CONTROL SYSTEM FOR INTERNAL COMBUSTION ENGINES

[75] Inventors: Tsuyoshi Takizawa; Hiroshi Ito; Yoichi Iwata; Toshihiko Sato; Naoki Iida; Takayoshi Nakayama, all of Wako, Japan

[73] Assignee: Honda Giken Kogyo K.K., Tokyo, Japan

[21] Appl. No.: 138,469

[22] Filed: Oct. 15, 1993

[30] Foreign Application Priority Data

Oct. 20, 1992 [JP] Japan .................................. 4-306396

[51] Int. Cl.⁶ ................................................ F01N 3/20
[52] U.S. Cl. ........................................ 60/276; 60/277; 60/285
[58] Field of Search ............................ 60/276, 277, 285

[56] References Cited

U.S. PATENT DOCUMENTS

| | | | |
|---|---|---|---|
| 4,703,619 | 11/1987 | Chujo | 60/285 |
| 5,165,230 | 11/1992 | Kayanuma | 60/277 |
| 5,203,165 | 4/1993 | Wild | 60/277 |
| 5,220,788 | 6/1993 | Kurita | 60/277 |

Primary Examiner—Douglas Hart
Attorney, Agent, or Firm—Arthur L. Lessler

[57] ABSTRACT

An air-fuel ratio control system for an internal combustion engine having a catalytic converter arranged in the exhaust system, and an air-fuel ratio sensor arranged upstream of the catalytic converter calculates an air-fuel ratio correction amount by means of proportional control and integral control based on an output from the air-fuel ratio sensor, and controls an air-fuel ratio of a mixture supplied to the engine, based on the air-fuel ratio correction amount. A control frequency at which the air-fuel ratio control is carried out is increased when deterioration of the catalytic converter is detected.

5 Claims, 13 Drawing Sheets

AIR-FUEL RATIO CONTROL SYSTEM FOR INTERNAL COMBUSTION ENGINES

BACKGROUND OF THE INVENTION

1. Field of the Invention

This invention relates to an air-fuel ratio control system for internal combustion engines, and more particularly to an air-fuel ratio control system for an internal combustion engine having an air-fuel ratio sensor arranged at a location upstream of a catalytic converter arranged in the exhaust system of the engine, which control system controls the air-fuel ratio of an air-fuel mixture supplied to the engine, based on an output from the air-fuel ratio sensor.

2. Prior Art

There is conventionally known a method of controlling the air-fuel ratio of an air-fuel mixture supplied to an internal combustion engine having an air-fuel ratio sensor arranged upstream of a three-way catalyst arranged in the exhaust system of the engine, which carries out feedback control of the air-fuel ratio of the mixture supplied to the engine (hereinafter referred to as "the supplied air-fuel ratio"), based on an output from the air-fuel ratio sensor.

Further, an air-fuel ratio control system has been proposed, for example, by Japanese Provisional Patent Publication (Kokai) No. 63-147941, which carries out feedback control of the supplied air-fuel ratio, based on an output from an air-fuel ratio sensor arranged downstream of a catalytic converter arranged in the exhaust system of an internal combustion engine, and which can deal with deterioration of the catalytic converter by detecting a deterioration degree of the catalyst of the catalytic converter, and changing a skip amount (proportional term) and an integral term applied in the feedback control in response to the detected deterioration degree.

However, when the feedback control is carried out based on the output from the air-fuel ratio sensor upstream of the catalytic converter, it is difficult to enable the catalytic converter to exhibit its performance to a satisfactory degree, only by changing the skip amount and the integral term according to the deterioration degree of the catalyst as in the above conventional control system. Therefore, the conventional control system still requires reducing an amount of CO and HC components in exhaust gases.

SUMMARY OF THE INVENTION

It is an object of the invention to provide an air-fuel ratio control system for an internal combustion engine which is capable of properly carrying out feedback control of the air-fuel ratio, based on an output from an air-fuel ratio sensor arranged upstream of a catalytic converter even when the catalytic converter is deteriorated, to thereby enable the catalytic converter to exhibit its performance to a satisfactory degree and hence minimize the amount of CO and CH components in the exhaust gases.

To attain the above object, the present invention provides an air-fuel ratio control system for an internal combustion engine having an exhaust system, a catalytic converter arranged in the exhaust system, and an air-fuel ratio sensor arranged upstream of the catalytic converter, comprising:

air-fuel ratio correction amount-calculating means for calculating an air-fuel ratio correction amount, by means of proportional control and integral control based on an output from the air-fuel ratio sensor;

air-fuel ratio control means for controlling an air-fuel ratio of a mixture supplied to the engine, based on the air-fuel ratio correction amount;

catalytic converter deterioration-detecting means for detecting deterioration of the catalytic converter; and frequency control means for increasing a control frequency at which air-fuel ratio control is carried out by the air-fuel ratio control system, when deterioration of the catalytic converter is detected.

Preferably, the frequency control means increases a frequency at which the air-fuel ratio correction amount is updated.

Also preferably, the air-fuel ratio correction amount comprises a proportional control term, and an integral control term, the frequency control means increasing a frequency at which the proportional control term is applied in the calculation of the air-fuel ratio correction amount.

To attain the same object, the present invention also provides an air-fuel ratio control system for an internal combustion engine having an exhaust system, a catalytic converter arranged in the exhaust system, an air-fuel ratio sensor arranged upstream of the catalytic converter, comprising:

delay means for delaying timing of determination as to inversion of an output from the air-fuel ratio sensor by a first predetermined period of time from a time a first inversion occurs in the output from the air-fuel ratio sensor, the first inversion being in a direction of change of the output from the air-fuel ratio sensor from a leaner side to a richer side, and for delaying the timing of determination as to inversion of the output from the air-fuel ratio sensor by a second predetermined period of time from a time a second inversion occurs in the output from the air-fuel ratio sensor, the second inversion being in a direction of change of the output from the air-fuel ratio sensor from the richer side to the leaner side;

air-fuel ratio correction amount-calculating means for calculating an air-fuel ratio correction amount, by means of proportional control and integral control based on an output from the delay means;

air-fuel ratio control means for controlling the air-fuel ratio of the mixture supplied to the engine, based on the air-fuel ratio correction amount;

catalytic converter deterioration-detecting means for detecting deterioration of the catalytic converter; and delay time-changing means for decreasing at least one of the first and second predetermined periods of time to a shorter value than a value assumed when no deterioration of the catalytic converter is detected, when deterioration of the catalytic converter is detected.

Preferably, the air-fuel ratio correction amount comprises a proportional control term, and an integral control term, the first and second predetermined periods of time each determining a period of time from the occurrence of the first or second inversion in the output from the air-fuel ratio sensor to a time point the proportional control term is applied in the calculation of the air-fuel ratio correction amount.

The above and objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
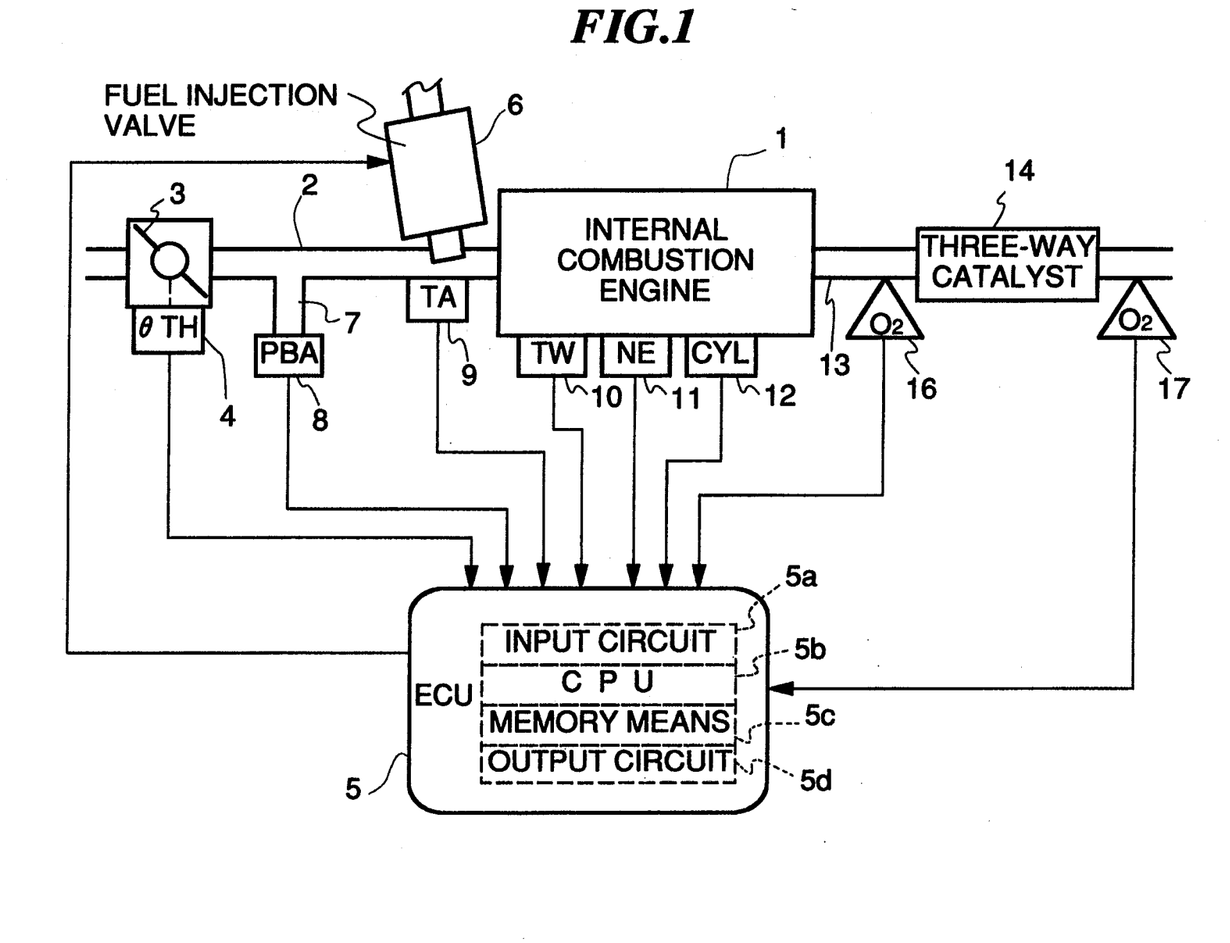
FIG. 1 is a block diagram showing the whole arrangement of an internal combustion engine and an air-fuel ratio control system therefor according to an embodiment of the invention.

Referring first to FIG. 1, there is shown the whole arrangement of an internal combustion engine and an air-fuel ratio control system therefor according to an embodiment of the invention. In the figure, reference numeral 1 designates an internal combustion engine. In an intake pipe 2 of the engine 1, there is arranged a throttle valve 3. The throttle valve 3 is connected to a throttle valve opening ($\theta$TH) sensor 4 for generating an electric signal indicative of the sensed throttle valve opening and supplying the same to an electronic control unit (hereinafter referred to as "the ECU") 5.

Fuel injection valves 6 are each provided for each cylinder and arranged in the intake pipe 2 between the engine 1 and the throttle valve 3 at a location slightly upstream of an intake valve, not shown. Each fuel injection valve 6 is connected to a fuel pump, not shown, and electrically connected to the ECU 5 to have its valve opening period controlled by a signal therefrom.

On the other hand, an intake pipe absolute pressure (PBA) sensor 8 is provided in communication with the interior of the intake pipe 2 via a conduit 7 at a location immediately downstream of the throttle valve 3 for sensing absolute pressure (PBA) within the intake pipe 2, and is electrically connected to the ECU 5 for converting the sensed absolute pressure PBA into a corresponding electric signal and supplying the same to the ECU 5. Further, at a location downstream of the absolute pressure (PBA) sensor 8, an intake air temperature (TA) sensor 9 is inserted into the intake pipe 2 for supplying an electric signal indicative of the sensed intake air temperature TA to the ECU 5.

An engine coolant temperature (TW) sensor 10, which may be formed of a thermistor or the like, is mounted in a coolant-filled cylinder block of the engine for supplying an electric signal indicative of the sensed engine coolant temperature TW to the ECU 5. An engine rotational speed (NE) sensor 11 and a cylinder discriminating (CYL) sensor 12 are arranged in facing relation to a camshaft or a crankshaft to the engine 1, neither of which is shown. The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder of the engine, both of the pulses being supplied to the ECU 5.

A three-way catalyst (catalytic converter) 14 is arranged in an exhaust pipe 13 of the engine 1 for purifying components of HC, CO, NOx, and the like present in the exhaust gases. Arranged in the exhaust pipe 13 at respective locations upstream and downstream of the three-way catalyst 14 are oxygen concentration sensors 16 and 17 (hereinafter referred to as "the upstream O2 sensor 16" and "the downstream O2 sensor 17", respectively) for detecting concentration of oxygen present in the exhaust gases at the respective locations, and supplying signals indicative of the sensed oxygen concentration to the ECU 5.

The ECU 5 comprises an input circuit 5a having the functions of shaping the waveform of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b, and for storing calculation results therefrom, etc. and an output circuit 5d which delivers driving signals to the fuel injection valves 6.

The CPU 5b operates in response to the above-mentioned signals from the sensors to determine operating conditions in which the engine 1 is operating, such as an air-fuel ratio feedback control region and open-loop control regions, and calculates, based upon the determined engine operating conditions, the valve opening period or a fuel injection period Tout over which the fuel injection valves 6 are to be opened in synchronism with generation of TDC signal pulses, by the use of the following equation (1):

$$Tout = Ti \times KO2 \times KLS \times K1 + K2 \qquad (1)$$

where Ti represents a basic fuel amount, i.e. a basic value of the fuel injection period Tout, which is determined according to the engine rotational speed NE and the intake pipe absolute pressure PBA and read from a Ti map stored in the memory means 5c.

KO2 represents an air-fuel ratio correction coefficient which is determined based on outputs from the upstream and downstream O2 sensors 16 and 17. The correction coefficient KO2 is set to a value such that the air-fuel ratio (oxygen concentration) detected by the upstream O2 sensor 16 becomes equal to a desired value when the engine 1 is operating in the air-fuel ratio feedback control region, while it is set to predetermined values corresponding to the respective operating regions of the engine when the engine 1 is in the open-loop control regions.

KLS represents an air-fuel ratio-leaning coefficient, which is set to a predetermined value smaller than 1.0 when the engine is in a predetermined decelerating condition, while it is set to a value of 1.0 when the engine is in conditions other than the decelerating condition.

K1 and K2 represent other correction coefficients and correction variables, respectively, which are set according to engine operating parameters to such values as optimize engine operating characteristics, such as fuel consumption and engine accelerability.

The CPU 5b supplies driving signals via the output circuit 5d to the fuel injection valves 6, based on the fuel injection period Tout thus calculated, to open the fuel injection valves 6.

Figure 2:
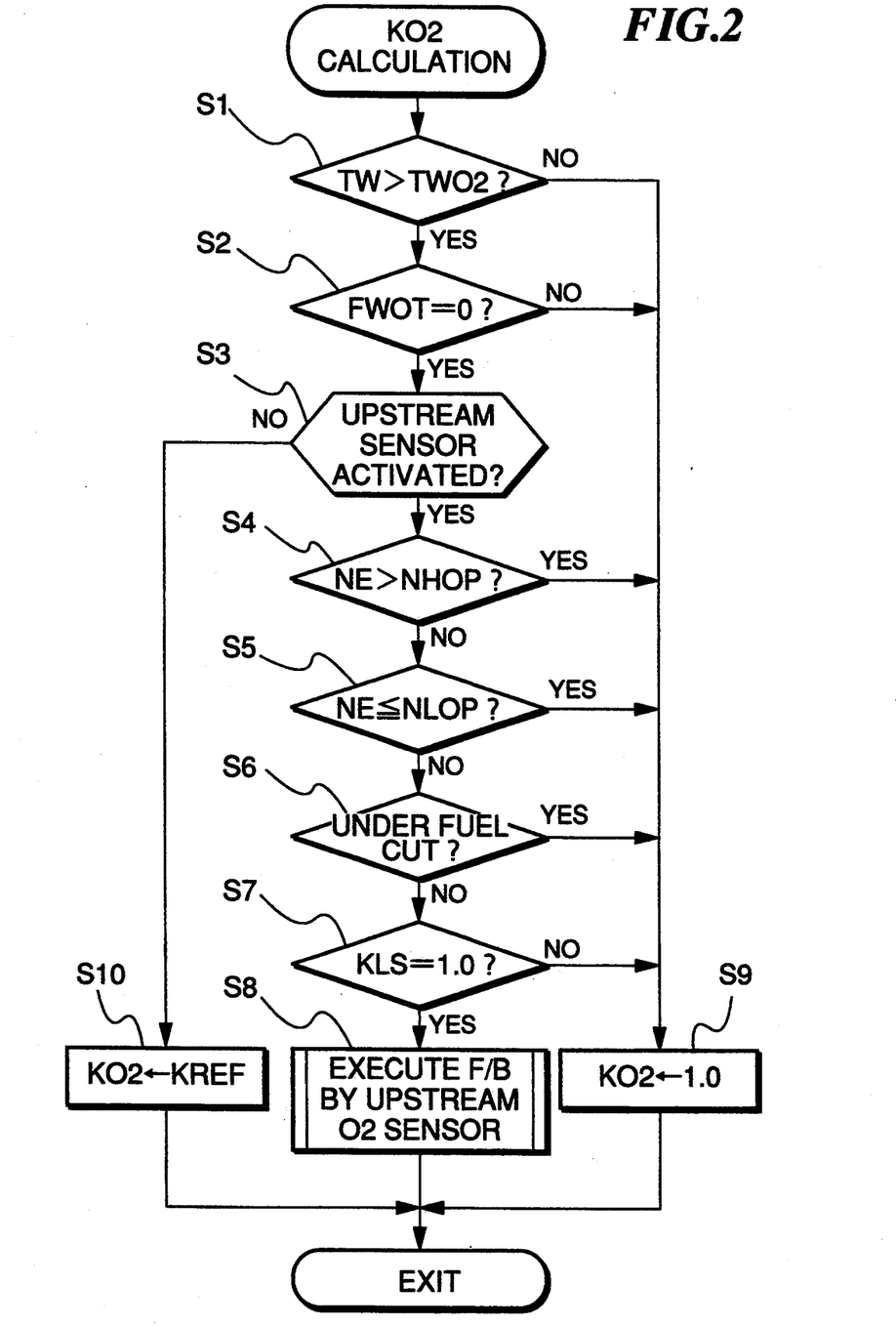
FIG. 2 is a flowchart showing a program for calculating an air-fuel ratio correction coefficient (KO2)

FIG. 2 shows a program for calculating the air-fuel ratio correction coefficient KO2, which is executed at predetermined fixed time intervals (e.g. 5 msec).

At steps S1 to S7, it is determined whether or not first feedback control-effecting conditions are satisfied, under which the feedback control based on the output from the upstream O2 sensor 16 can be executed. Specifically, it is determined whether or not an engine coolant temperature TW is higher than a first predetermined engine coolant temperature TWO2 (e.g. 25° C.) at the step S1, whether or not a flag FWOT which is set to a value of 1 when the engine is in a predetermined high load operating condition is equal to a value of 0 at the step S2, whether or not the upstream O2 sensor 16 is activated at the step S3, whether or not the engine rotational speed NE is higher than a predetermined higher engine rotational speed NHOP at the step S4, whether or not the engine rotational speed NE is equal to or smaller than a predetermined lower engine rotational speed NLOP at the step S5, whether or not the engine is under fuel cut at the step S6, and whether or not the air-fuel ratio-leaning coefficient KLS is equal to a value of 1.0 at the step S7. When the engine coolant temperature TW is higher than the predetermined engine coolant temperature TWO2, when FWOT=0, when the engine is not in the predetermined high load engine operating condition, when the upstream O2 sensor 16 is activated, when the engine rotational speed NE falls within a range of NLOP<NE≦NHOP, when the engine is not under fuel cut, when KLS=1.0, and when the engine is not in the predetermined decelerating condition, it is determined that the first feedback control-effecting conditions are satisfied, and then the program proceeds to a step S8, where the correction coefficient KO2 is calculated based on the output from the upstream O2 sensor 16.

Further, if both of TW>TWO2 and FWOT=0 are satisfied and at the same time the upstream O2 sensor 16 is inactivated, the program jumps over to a step S10, where the correction coefficient KO2 is set to a learned value KREF calculated during the feedback control at the step S8. If any one of the feedback control-effecting conditions is not satisfied, the program proceeds to a step S9, where the correction coefficient KO2 is set to a value of 1.0.

Figures 3, 3A:
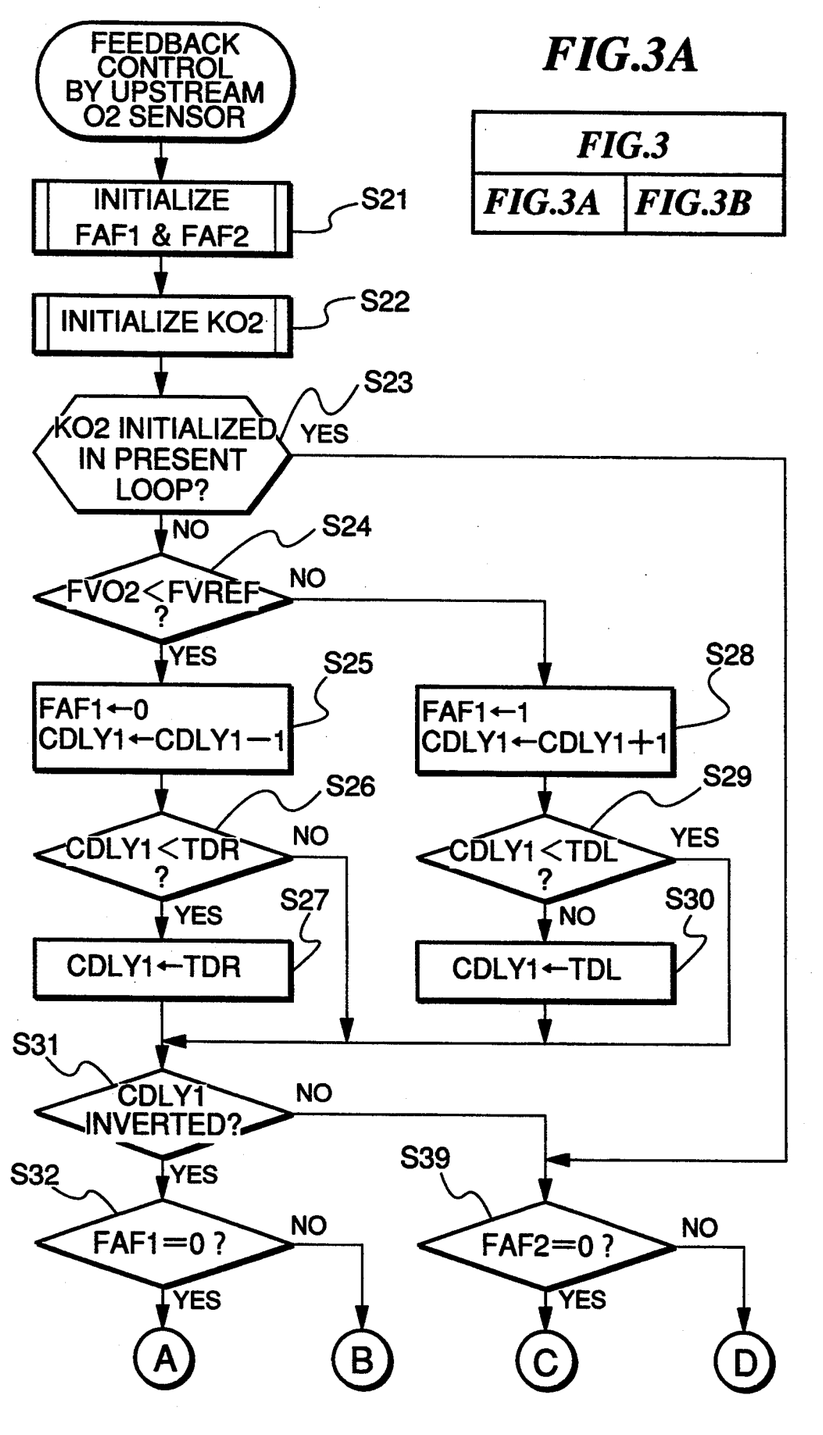
FIG. 3A is a flowchart showing a subroutine for calculating the air-fuel ratio correction coefficient KO2, based on an output from an O2 sensor arranged upstream of a catalytic converter.
Figure 3B:
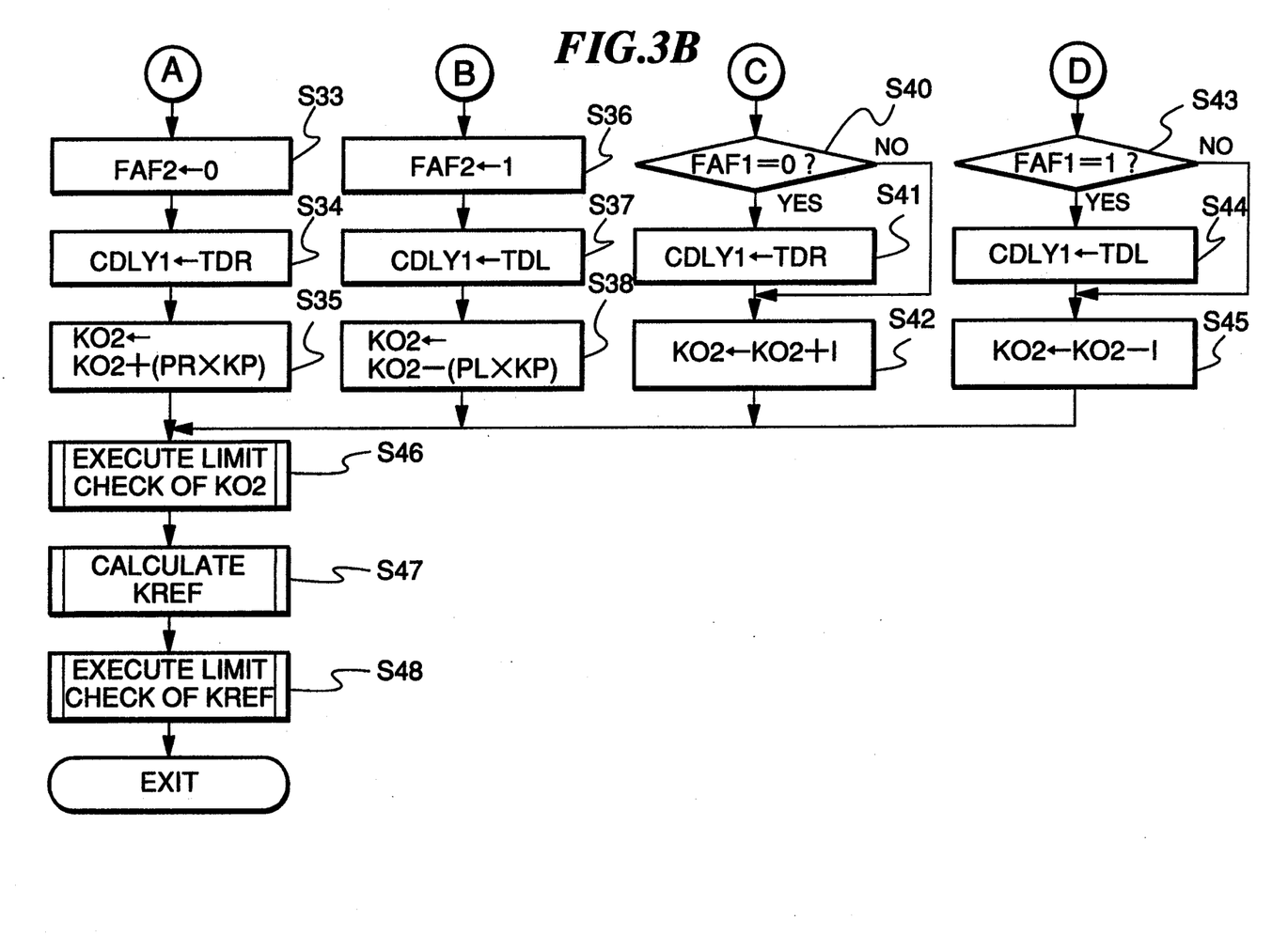
FIG. 3B is a continued part of the flowchart of FIG. 3A.

FIGS. 3A and 3B show a subroutine executed at the step S8 of FIG. 2, where the correction coefficient KO2 is calculated in response to a voltage value FVO2 outputted from the upstream O2 sensor 16.

Figures 6A, 6B:
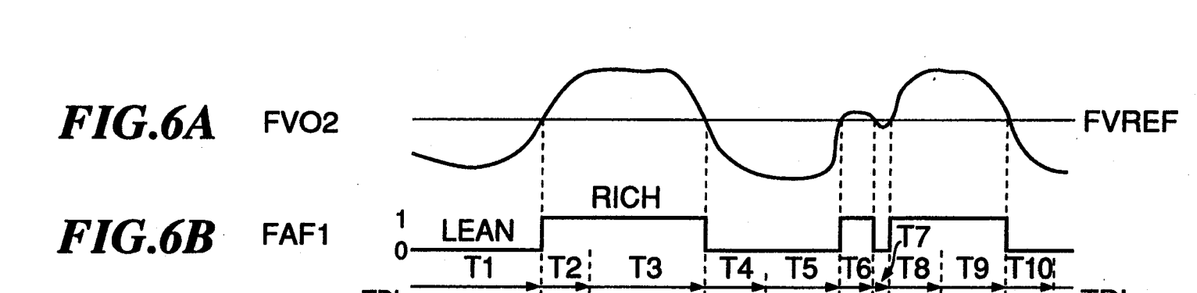
FIG. 6 is a timing chart useful in explaining the operation of the program of FIGS. 3A and 3B.
Figures 6C, 6D:
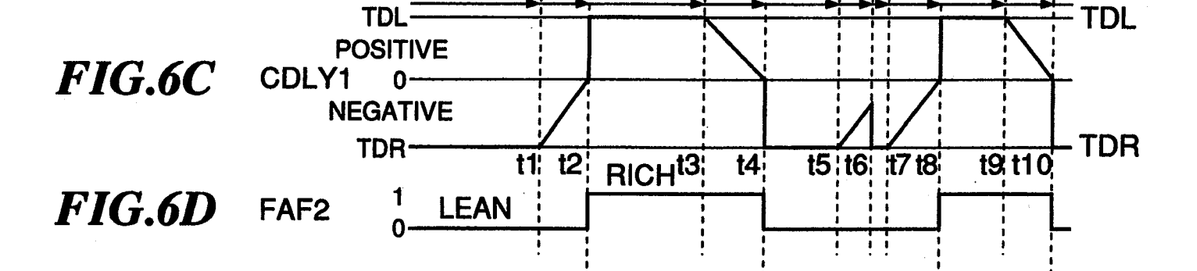

At a step S21, first and second lean/rich flags FAF1 and FAF2 are initialized. As shown in FIGS. 6(a) and 6(b), the first lean/rich flag FAF1 is set to a value of 1 when the output voltage value FVO2 from the upstream O2 sensor 16 is higher than a reference voltage FVREF (e.g. 0.45 V), that is, when the output voltage value FVO2 indicates a rich state of the supplied air-fuel ratio, and as shown in FIG. 6(d), the second lean/rich flag FAF2 is set to the same value as that of the flag FAF1 upon the lapse of a predetermined time period from a time point the first lean/rich flag FAF1 has been inverted, i.e. when the flag FAF1 has been changed from 0 to 1 or 1 to 0.

Figure 4:
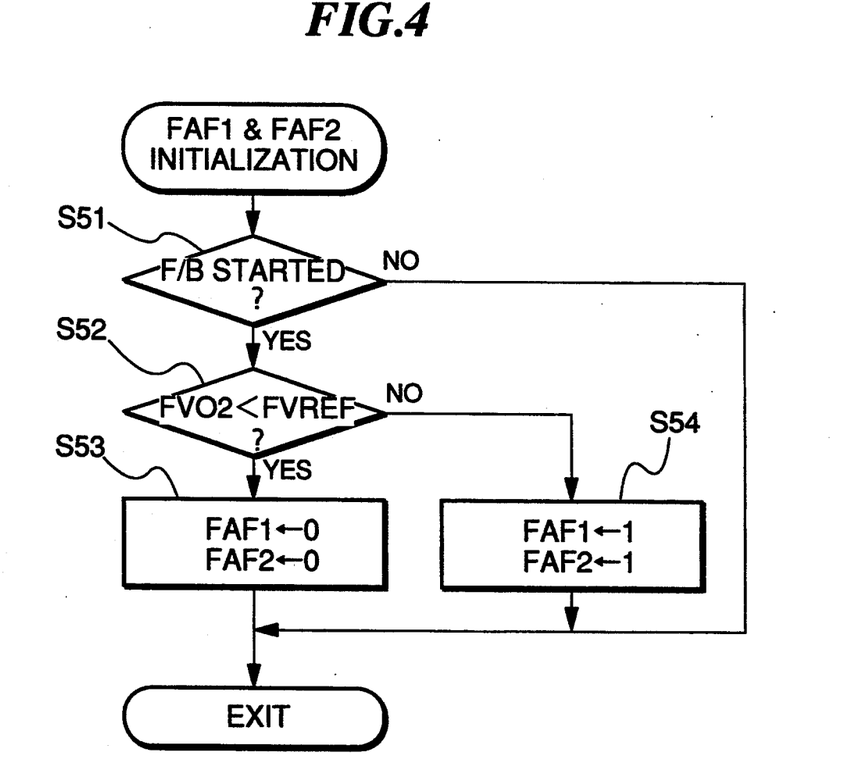
FIG. 4 is a flowchart showing a subroutine of the FIG. 3A program for initializing a flag used in steps of FIGS. 3A and 3B.

The initialization of these flags FAF1 and FAF2 is executed according to a subroutine shown in FIG. 4. Specifically, first, it is determined at a step S51 whether or not the present loop is immediately after the start of the feedback control, i.e. whether or not the open-loop control was executed in the last loop and the feedback control is to be started in the present loop. If it is determined that the present loop is not the first loop for execution of the feedback control, it is not required to initialize the flags FAF1 and FAF2, and therefore, the present program is immediately terminated.

If the present loop is the first loop for execution of the feedback control, it is determined at a step S52 whether or not the output voltage FVO2 from the upstream O2 sensor 16 is lower than the reference voltage FVREF. If FVO2<FVREF is satisfied, both of the first and second lean/rich flags FAF1 and FAF2 are set to a value of 0 at a step S53, whereas if FVO2≧FVREF, both of the flags are set to a value of 1 at a step S54.

Referring again to the FIG. 3A program, the KO2 value is initialized at a step S22. Specifically, if the present loop is immediately after the shift from the open loop control to the feedback control, or if the throttle valve 3 is suddenly opened during the feedback control mode, the learned value KREF to be calculated at a step S47, described hereinafter, is applied as an initial value of the KO2 value. If the present loop is in a condition other than the above conditions, no initialization of the KO2 value is executed at the step S22.

At the following step S23, it is determined whether or not the KO2 value has been initialized in the present loop. If it is determined that the KO2 value has been initialized, the program jumps over to a step S39, whereas if the initialization has not been executed, the program proceeds to a step S24.

When the feedback control is being started, the answer to the question of the step S23 is affirmative (YES), and hence at steps S39 to S45 an initial value of a P term-generating delay counter CDLY1 is set and integral control (I term control) of the KO2 value is executed in response to the values of the lean/rich flags FAF1 and FAF2. As shown in FIGS. 6(b), 6(c) and (d), the counter CDLY1 measures a delay time from a time point the first lean/rich flag FAF1 is inverted to a time point the second lean/rich flag FAF2 is inverted, i.e. a time period from a time point the O2 sensor output FVO2 is inverted to a time point the proportional control (P term control) is executed.

At the step S39, it is determined whether or not the second lean/rich flag FAF2 is set to a value of 0. If FAF2=0, the program proceeds to the step S40 of FIG. 3B, where it is determined whether or not the first lean/rich flag FAF1 is set to a value of 0. On the other hand, if FASF2=1, the program proceeds to the step S43 of FIG. 3B, where it is determined whether or not the first lean/rich flag FAF1 is set to a value of 1. When the feedback control is being started, if FVO2<FVREF, both of the flags FAF1 and FAF2 are set to 0 (see FIG. 4), and therefore, the program proceeds via the steps S39 and S40 to the step S41, where the counter CDLY1 is set to a predetermined negative value TDR (e.g. approx. 120 msec). If FVO2≧FVREF, both of the flags FAF1 and FAF2 are set to 1, and therefore, the program proceeds via the steps S39 and S43 to the step S44, where the counter CDLY1 is set to a predetermined positive value TDL (e.g. approx. 40 msec). If both of the flags FAF1 and FAF2 are not equal to a value of 0 or 1, the counter CDLY1 is not initialized. If FAF2=0, a predetermined value I is added to the KO2 value at the step S42, whereas if FAF2 =1, the predetermined value I is subtracted from the KO2 value at the step S45, followed by program proceeding to a step S46.

If the answer to the question of the step S23 of FIG. 3A is negative (NO), i.e. if the KO2 value has not been initialized in the present loop, the program proceeds to a step S24, where it is determined-whether or not the upstream O2 sensor output voltage FVO2 is lower than the reference voltage FVREF. If FVO2<FVREF, the program proceeds to a step S25, where the first lean/rich flag FAF1 is set to a value of 0 and the P-term generating delay counter CDLY1 is decremented by a value of 1 (see T4 and T10 of FIG. 6(c)). Then, it is determined at a step S26 whether or not the count value of the counter CDLY1 is smaller than the predetermined negative value TDR. If CDLY1<TDR, the counter CDLY1 is set to the value TDR at a step S27, whereas if CDLY≧TDR, the program immediately proceeds to a step S31.

if the answer to the question of the step S24 is negative (NO), i.e. if FVO2≧FVREF, the first lean/rich flag FAF1 is set to 1, and the counter CDLY1 is incremented by 1 (see T2, T6 and T8 of FIG. 6(c)). Then, it is determined at a step S29 whether or not the count value of the counter CDLY1 is smaller than the predetermined positive value TDL. If CDLY1≧TDL, the counter CDLY1 is set to the value TDL at a step S30, whereas if CDLY1<TDL, the program immediately proceeds to the step S31.

In this way, the steps S26, S27, S29 and S30 function so that the count value of the counter CDLY1 does not become smaller than the predetermined negative value TDR nor larger than the predetermined positive value TDL.

At the step S31, it is determined whether or not the sign (plus or minus sign) of the count value of the counter CDLY1 has been inverted. If the sign has not been inverted, the I term control is executed at the steps S39 to S45, whereas if the sign has been inverted, the P term control is executed at steps S32 to S38.

Figure 5:
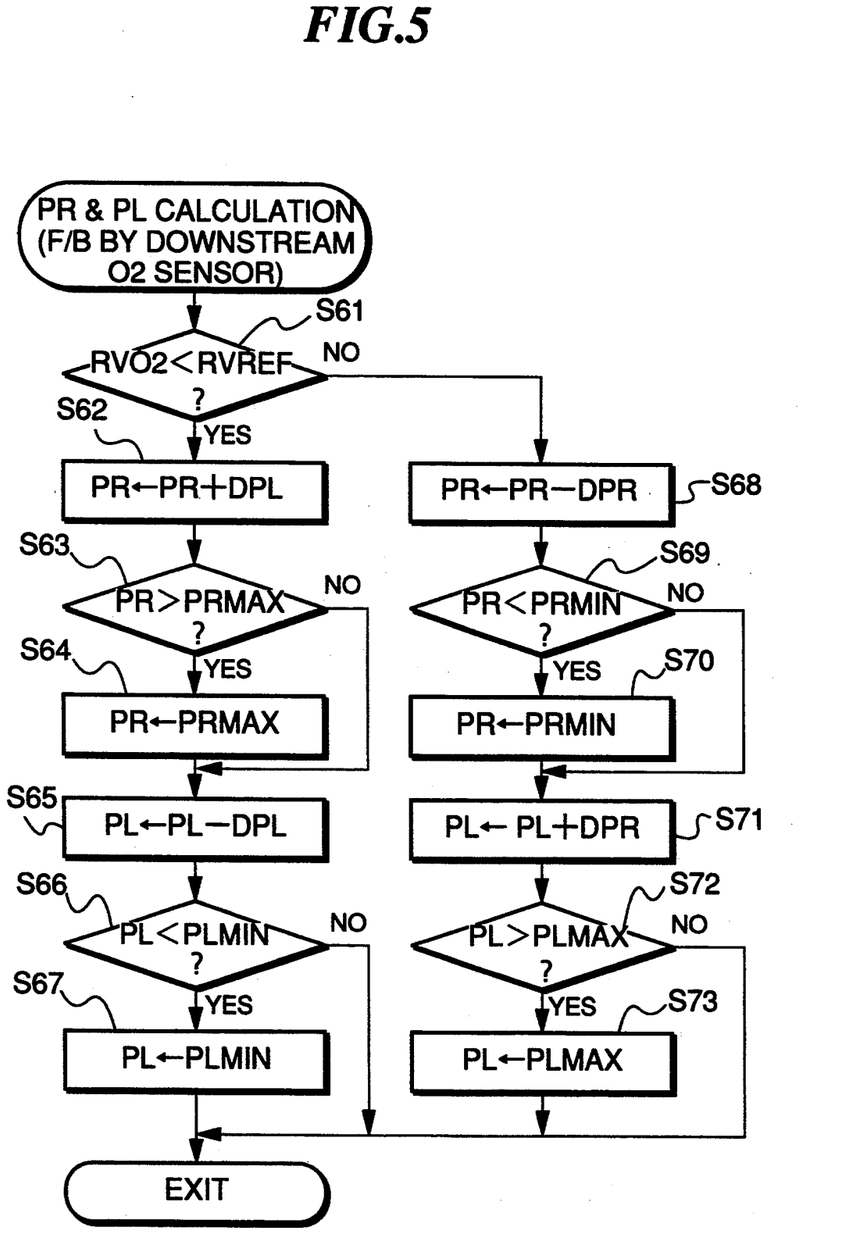
FIG. 5 is a flowchart showing a program calculating parameter values PR and PL, based on the output from the O2 sensor downstream of the catalytic converter.

At the step S32, it is determined whether or not the first lean/rich flag FAF1 is equal to a value of 0. If FAF1=0, the program proceeds to the step S33 of FIG. 3B, where the second lean/rich flag FAF2 is set to a value of 0, and then the count value of the counter CDLY1 is set to the predetermined negative value TDR at the step S34. Further, the correction coefficient KO2 is calculated at the step S35 by the use of the following equation (2) (see time points t4 and t10 of FIG. 6):

$$KO2 = KO2 + PR \times KP \qquad (2)$$

where PR represents an enriching proportional term (P term) and KP represents a P term correction coefficient. The PR value is calculated according to a program of FIG. 5, described hereinafter, and the KP value is read from a map, not shown, which is set in accordance with the engine rotational speed NE and the intake pipe absolute pressure PBA.

If the answer to the question of the step S32 is negative (NO), i.e. if FAF1=1, the second lean/rich flag FAF2 is set to 1 at the step S36, and the count value of the counter CDLY1 is set to the predetermined positive value TDL at the step S37. Further, the correction coefficient KO2 is calculated at the step S38 by the use of the following equation (3) (see time points t2 and t8 of FIG. 6).

$$KO2 = KO2 - PL \times KP \qquad (3)$$

where PL represents a leaning proportional term (P term). The PL value is calculated by the program of FIG. 5 in the same manner as in the calculation of the PR value.

After the KO2 value is thus calculated at the step S35, S38, S42 or S45, at a step S46, limit check of the KO2 value is carried out, and the learned value KREF of the KO2 is calculated at the step S47. Further, limit check of the KREF value is carried out at a step S48, followed by terminating the present program.

According to the program of FIGS. 3A and 3A described above, as shown in FIG. 6, the P term control is executed (time points t2, t4, t8 and t10) after a predetermined delay time (T2, T4, T8 and T10) from a time point the upstream O2 sensor output voltage FVO2 has been inverted (time points t1, t3, t7 and t9). For a time period over which the second lean/rich flag FAF2 is equal to 0, the I term control for increasing the KO2 value is executed (T1, T2 and T5 to T8), whereas for a time period over which the flag FAF2 is equal to 1, the I term control for decreasing the KO2 value is executed (T3, T4, T9 and T10). Incidentally, the 02 sensor output FVO2 varies with a short repetition period over a time period from the time point t5 to the time point t7, however, the period of variation in the sensor output FVO2 is shorter than the delay time of the P term control corresponding to the predetermined negative value TDR, and therefore, the second lean/rich flag FAF2 is not inverted, resulting in no execution of the P term control over the above time period.

FIG. 5 shows a program for calculating the enriching P term PR and the leaning P term PL used in the FIGS. 3A and 3B program. The present program is executed at predetermined fixed time intervals (e.g. 100 msec).

The PR value and the PL value are basically calculated based on an output voltage value RVO2 from the downstream O2 sensor 17 (second feedback control). However, when the second feedback control cannot be executed (e.g. during idling of the engine, when the downstream O2 sensor 17 is inactive, etc.), a predetermined value or the learned value calculated during the feedback control is applied as the PR and PL values.

Figure 7A:
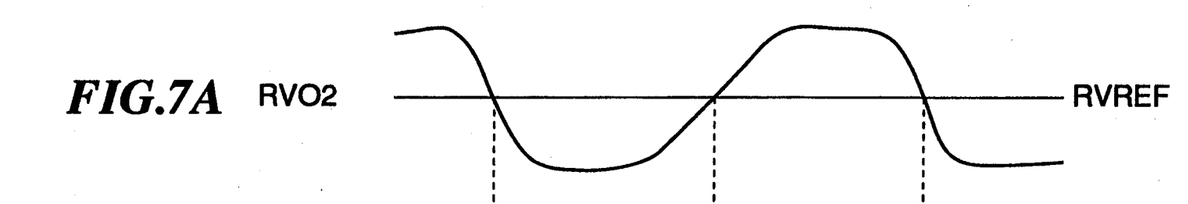
FIG. 7 is a timing chart useful in explaining the operation of the program of FIG. 5.
Figure 7B:
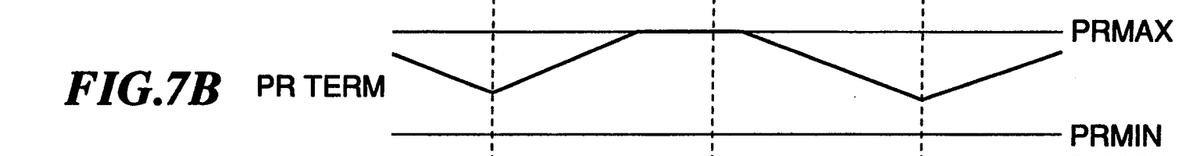

At a step S61, it is determined whether or not the downstream O2 sensor output voltage RVO2 is lower than a reference value RVREF (e.g. 0.45 V). If RVO2<RVREF, the program proceeds to a step S62, where a leaning-determining correction term DPL is added to the PR value (see T2 and T4 of FIG. 7B). When the PR value exceeds an upper limit value PRMAX at a step S63, the PR value is set to the upper limit value PRMAX at a step S64.

Figure 7C:
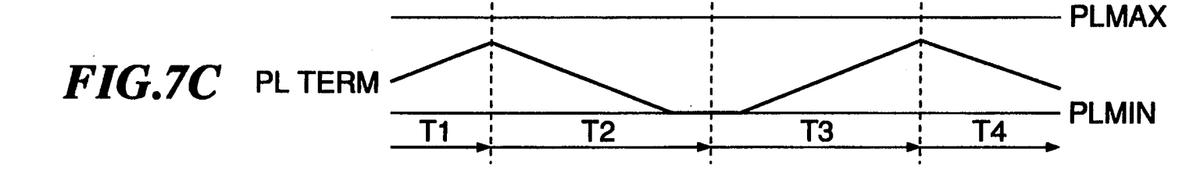

At the next step S65, the leaning-determining correction term DPL is subtracted from the PL value (see T2 T4 of FIG. 7(c)). If the PL value is smaller than a lower limit value PLMIN at a step S66, the PL value is set to the lower limit value PLMIN at a step S67.

On the other hand, if the answer to the question of the step S61 is negative (NO), i.e. if RVO2≧RVREF, the program proceeds to a step S68, where an enrichment-determining correction term DPR is subtracted from the PR value (see T1 and T3 of FIG. 7B). If it is determined at a step S69 that the PR value after the subtraction is smaller than a lower limit value PRMIN, the PR value is set to the lower limit value PRMIN at a step S70.

Then, at a step S71, the enrichment-determining correction term DPR is added to the PL value (see T1 and T3 of FIG. 7(c)). If it is determined at a step S72 that the PL value after the addition is larger than an upper limit value PLMAX, the PL value is set to the upper limit value PLMAX at a step S73.

According to the program of FIG. 5 described above, as shown in FIG. 7, for a time period over which RVO2<RVREF holds (T2 and T4), the PR value is increased within a range between the lower and upper limit values PRMIN and PRMAX, while the PL value is decreased within a range between the lower limit value and the upper limit value PLMIN and PLMAX. On the other hand, for a time period over which RVO2≧RVREF (T1 and T3)P, the PR value is decreased, and the PL value is increased within the above-mentioned respective ranges.

Figure 9:
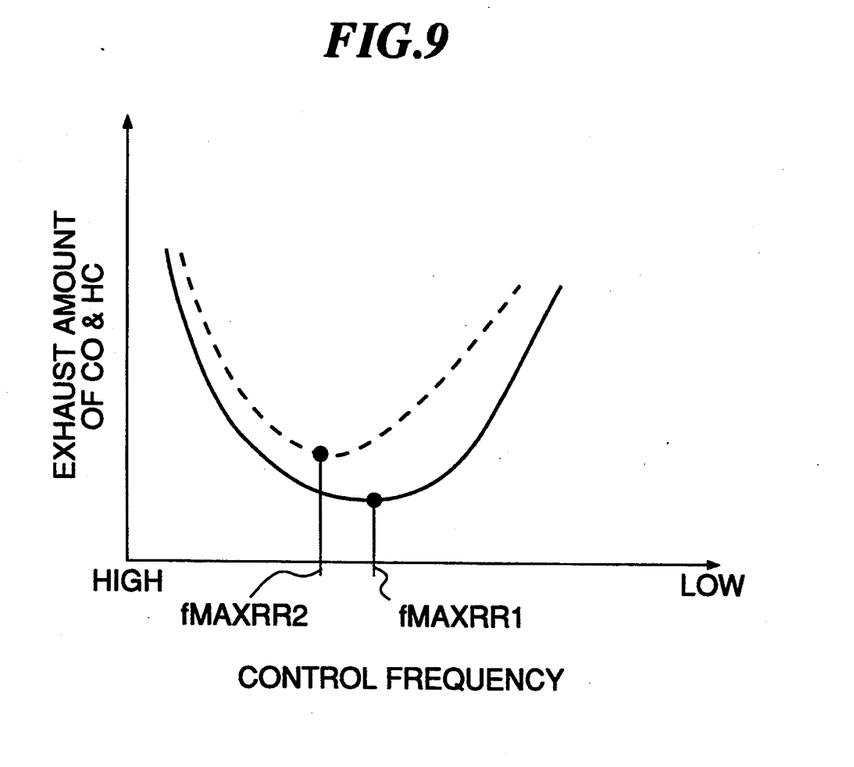
FIG. 9 is a diagram showing the relationship between a feedback control frequency and an amount of CO and HC components.

Next, how the predetermined values TDR and TDL (first and second predetermined time periods) which determine delay times from an inversion of the first lean/rich flag FAF1 to an inversion of the second lean/rich flag FAF2 are determined depending upon whether or not the performance of the three-way catalyst 14 is deteriorated will be described hereinbelow with reference to FIG. 9.

As shown in the figure, when no deterioration of the catalyst performance is detected at a step S84, the TDR and TDL values are set to respective predetermined values TDR1 and TDL1 for normal catalyst (e.g. values corresponding, respectively, to 120 msec and 40 msec) at a step S85. However, when deterioration of the catalyst performance is detected at the step S84, the TDR and TDL values are set to respective predetermined values TDR2 and TDL2 for deteriorated catalyst (e.g. values corresponding, respectively, to 60 msec and 10 msec) at a step S86.

Figure 6E:
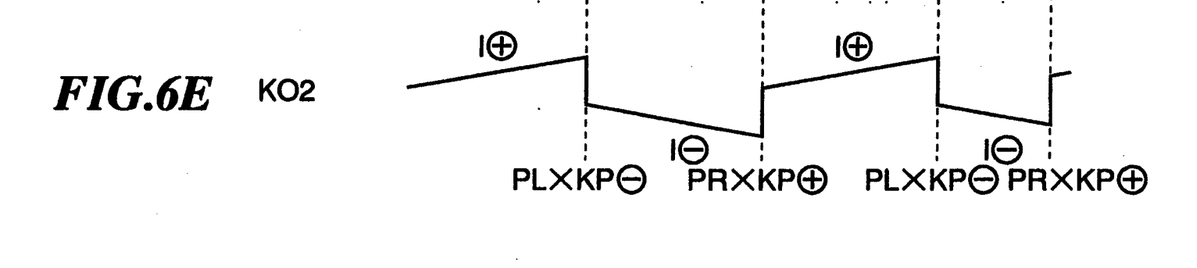

The reason why the predetermined values TDR and TDL are set as described above is as follows: That is, as shown in FIG. 9, the amount of CO and HC components exhausted from the three-way catalyst 14 varies in dependence on a control frequency fCTL of the air-fuel ratio feedback control (which corresponds to the frequency of updating of the air-fuel ratio correction coefficient KO2 shown in FIG. 6(e)), and there are specific frequencies fMAXRR1 and fMAXRR2 at which the amount of CO and HC components in the exhaust gases is reduced to a minimum (maximum reduction rate frequencies). In FIG. 9, the solid line indicates a characteristic of a catalyst having normal performance, and the broken line indicates a characteristic of a catalyst having deteriorated performance, wherein a relationship of fMAXRR2>fMAXRR1 stands.

Therefore, according to the invention, by utilizing the fact that the control frequency fCTL becomes higher as the value |TDR| and/or the value TDL is set smaller (see FIG. 6), the values |TDR| and TDL are set such that a condition of fCTL=fMAXRR1 stands before occurrence of deterioration of the catalyst, whereas a condition of fCTL=fMAXRR2 stands after occurrence of deterioration of the catalyst.

By setting the |TDR| and TDL values as mentioned above, the performance of the catalyst can be exhibited to a sufficient degree after the occurrence of deterioration thereof, to thereby minimize the CO and HC components in the exhaust gases.

Although in the present embodiment, when the catalyst is deteriorated, both of the |TDR| and TDL values are set to smaller values than those assumed before the occurrence of deterioration of the catalyst, this should not be construed to be limitative, but only one of the |TDR| and TDL values may be set to a smaller value.

Next, how deterioration of the performance of the three-way catalyst 14 is determined will be described with reference to FIGS. 10 to 12. As shown in FIG. 11, during execution of the feedback control in which the correction coefficient KO2 is calculated based only on the output RVO2 from the downstream O2 sensor 17, a time period TL from a time point a special P term PLSP for skipping the KO2 value in the decreasing direction is generated to a time point the O2 sensor output RVO2 is inverted, and a time period TR from a time point a special P term PRSP for skipping the KO2 value in the increasing direction is generated to a time point the O2 sensor output RVO2 is inverted, are calculated. The determination of deterioration of the catalyst performance is carried out based on the thus obtained time periods TL and TR.

Figure 10:
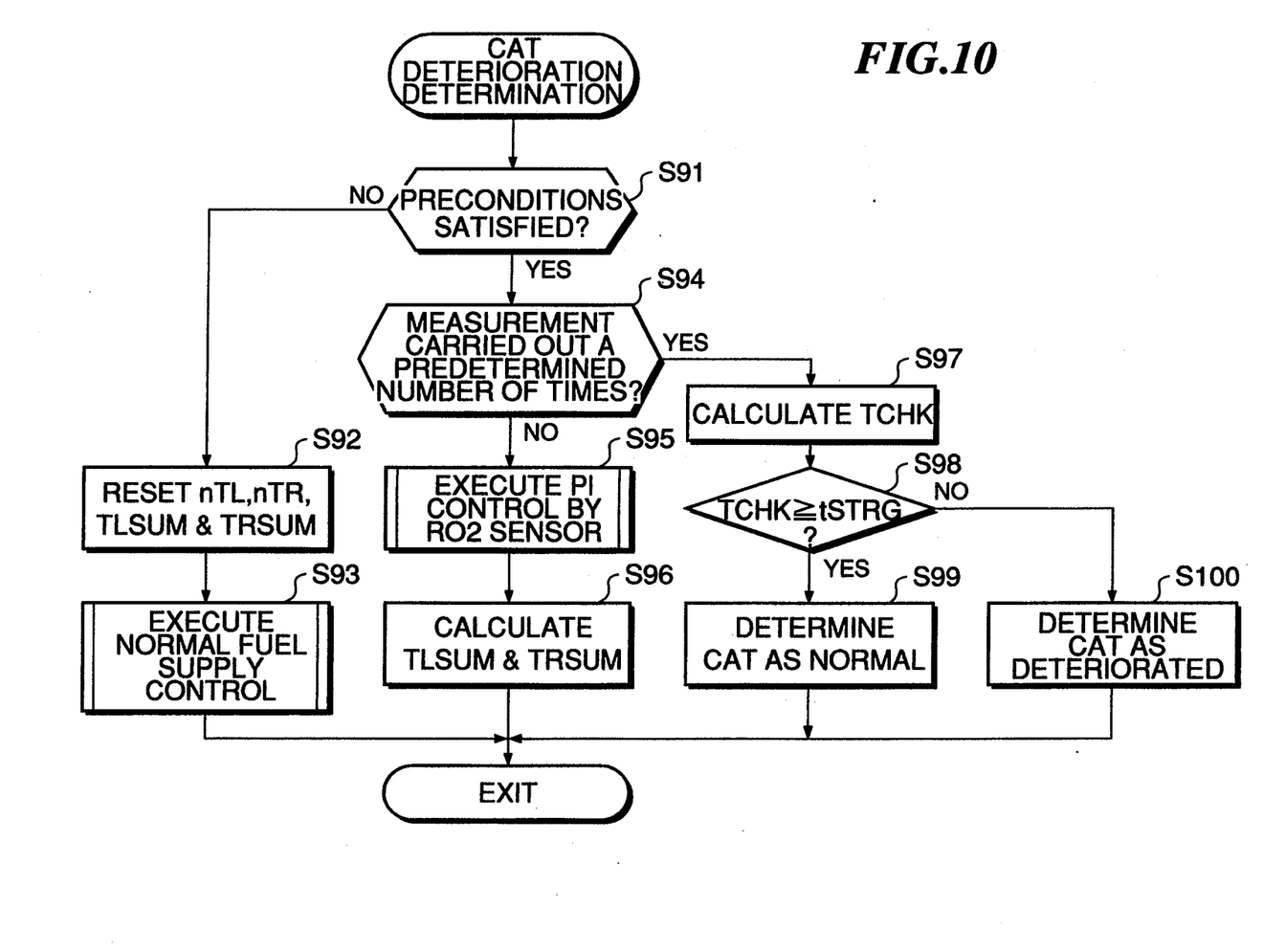
FIG. 10 is a flowchart showing a program for carrying out determination of deterioration of the catalytic converter.
Figures 11A, 11B:
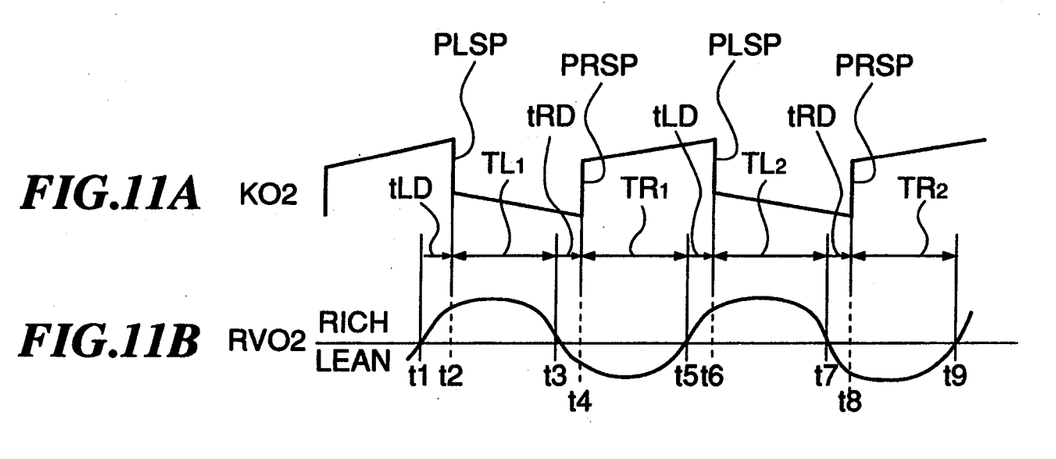
FIG. 11 is a timing chart useful in explaining the operation of the program of FIG. 10.

FIG. 10 shows a program for executing the above deterioration determination. At a step S91 of the figure, it is determined whether or not preconditions for the deterioration determination are satisfied. The preconditions are satisfied when the engine is operating in a steady condition.

If the preconditions are not satisfied, respective integral values TLSUM and TRSUM of the time periods TL and TR and respective numbers of times of measurement nTL and nTR of the time periods TL and TR are all reset to 0 at a step S92, and the normal fuel supply control according to the programs of FIGS. 3A, 3B to 5 is executed at a step S93.

If the preconditions are satisfied, it is determined at a step S94 whether or not the measurements of the TL and TR values have been carried out a predetermined number of times. In the first loop of execution of the program, the answer to the question at the step S94 becomes negative (NO), and therefore the program proceeds to a step S95, where the PI (proportional integral) control based only on the downstream O2 sensor output RVO2 is executed, and the TL and TR values are measured. Then, the integral values TLSUM and TRSUM thereof are calculated at a step S96.

Specifically, as shown in FIG. 11, at a time point t2 a predetermined time period tLD has elapsed after a time point t1 a lean-to-rich inversion of the O2 sensor output RVO2 occurred, the KO2 value is skipped in the decreasing direction using the special P term PLSP, and then the I term control is executed by gradually decreasing the KO2 value from a time point t3 a rich-tolean inversion of the sensor output RVO2 occurs to a time point t4 a predetermined time period tRD has elapsed after the time point t3. The time period from the time point t2 to the time point t3 is measured as a TL value ($TL_1$). Next, at the time point t4, the KO2 value is skipped in the increasing direction by the use of the special P term PRSP in the rich direction, and then the I term control is executed by gradually increasing the KO2 value after a time point t5 a lean-to-rich inversion of the sensor output RVO2 occurs to a time point t6 a predetermined time period tLD has elapsed after the time point t5. The time period from the time point t4 to the time point t5 is measured as a TR value ($TR_1$). Thereafter, $TL_2$, $TR_2$, ... are successively measured in the same manner as above, followed by calculating integral values TLSUM and TRSUM of the measured TL and TR values.

If the answer to the question of the step S94 is affirmative (YES), i.e. if the measurement has been carried out the predetermined number of times, a determination time period TCHK is calculated by the use of the following equation (4) at a step S97:

$$TCHK = (TLSUM/nTL + TRSUM/nTR)/2 \qquad (4)$$

Then, it is determined whether or not the determination time period TCHK is equal to or larger than a predetermined value tSTRG at a step S98. If the TCHK is equal to or larger than the predetermined value tSTRG, it is determined at a step S99 that the catalyst is in a normal state, whereas if it is smaller than the predetermined value tSTRG, it is determined at a step S100 that the catalyst is deteriorated.

Figure 12:
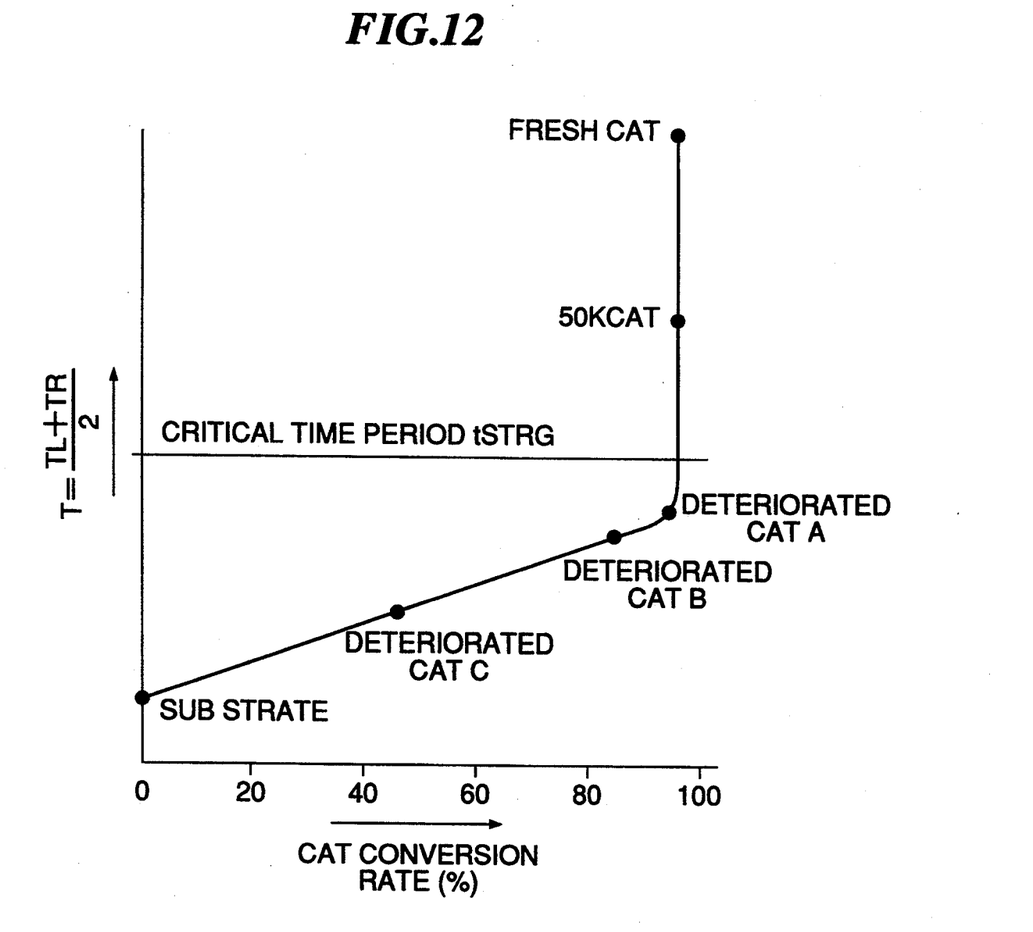
FIG. 12 is a graph useful in explaining a manner of determination of deterioration of the catalytic converter.

This deterioration determination is based on the fact that an average value T of the time periods TL and TR and the purification rate of the catalyst (CAT conversion rate) are in the relationship as shown in FIG. 12. As shown in the figure, the average value T decreases as the performance of the catalyst (02 storage capacity) is deteriorated. By utilizing this relationship, the deterioration of the catalyst can be accurately determined.

Figure 8:
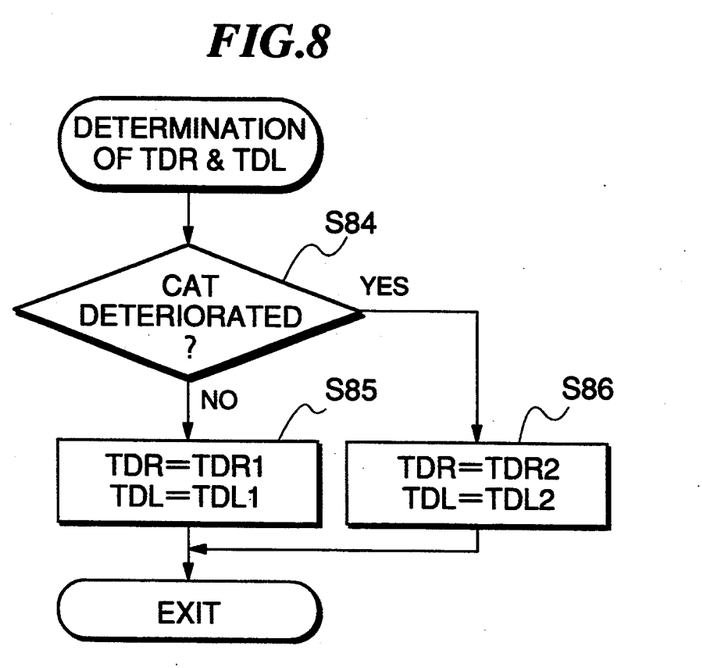
FIG. 8 is a flowchart showing a program for calculating parameter values TDL and TDR used in the program of FIGS. 3A and 3B.

As is apparent from FIG. 12, the determination time period TCHK reflects the deterioration degree of the catalyst, and therefore the predetermined values TDR and TDL shown in FIG. 8 may be set so as to gradually change with advancement of the deterioration degree of the catalyst.

What is claimed is:

1. An air-fuel ratio control system for an internal combustion engine having an exhaust system, a catalytic converter arranged in said exhaust system, and an air-fuel ratio sensor arranged upstream of said catalytic converter, comprising:

air-fuel ratio correction amount-calculating means for calculating an air-fuel ratio correction amount, by means of proportional control and integral control based on an output from said air-fuel ratio sensor;

air-fuel ratio control means for controlling an air-fuel ratio of a mixture supplied to said engine, based on said air-fuel ratio correction amount;

catalytic converter deterioration-detecting means for detecting deterioration of said catalytic converter; and frequency control means for increasing a control frequency at which air-fuel ratio control is carried out by said air-fuel ratio control system, when deterioration of said catalytic converter is detected.

2. An air-fuel ratio control system as claimed in claim 1, wherein said frequency control means increases a frequency at which said air-fuel ratio correction amount is updated.

3. An air-fuel ratio control system as claimed in claim 2, wherein said air-fuel ratio correction amount comprises a proportional control term, and an integral control term, said frequency control means increasing a frequency at which said proportional control term is applied in said calculation of said air-fuel ratio correction amount.

4. An air-fuel ratio control system for an internal combustion engine having an exhaust system, a catalytic converter arranged in said exhaust system, and an air-fuel ratio sensor arranged upstream of said catalytic converter, comprising:

delay means for delaying timing f determination as to inversion of an output sensor from said air fuel ratio by a first predetermined period of time from a time a first inversion occurs in said output from-said air-fuel ratio sensor, said first inversion being in a direction of change of said output from said air-fuel ratio sensor from a leaner side to a richer side, and for delaying said timing of determination as to inversion of said output from said air-fuel ratio sensor by a second predetermined period of time from a time a second inversion occurs in said output from said air-fuel ratio sensor, said second inversion being in a direction of change of said output from said air-fuel ratio sensor from the richer side to the leaner side;

air-fuel ratio correction amount-calculating means for calculating an air-fuel ratio correction amount, by means of proportional control and integral control based on an output from said delay means;

air-fuel ratio control means for controlling the air-fuel ratio of said mixture supplied to said engine, based on said air-fuel ratio correction amount;

catalytic converter deterioration-detecting means for detecting deterioration of said catalytic converter; and delay time-changing means for decreasing at least one of said first and second predetermined periods of time to a shorter value than a value assumed when no deterioration of said catalytic converter is detected, when deterioration of said catalytic converter is detected.

5. An air-fuel ratio control system as claimed in claim 4, wherein said air-fuel ratio correction amount comprises a proportional control term, and an integral control term, said first and second predetermined periods of time each determining a period of time from said occurrence of said first or second inversion in said output from said air-fuel ratio sensor to a time point said proportional control term is applied in said calculation of said air-fuel ratio correction amount.

* * * * *